(12) United States Patent
Chambers et al.

(10) Patent No.: US 11,113,976 B2
(45) Date of Patent: *Sep. 7, 2021

(54) UNMANNED AERIAL VEHICLE MANAGEMENT SYSTEM

(71) Applicant: Zipline International Inc., South San Francisco, CA (US)

(72) Inventors: Andrew Chambers, San Francisco, CA (US); Bryan Wade, Redwood City, CA (US); Catalin Drula, Bucharest (RO); David Halley, Los Osos, CA (US); Igor Napolskikh, Mississauga, CA (US); Keenan Wyrobek, Half Moon Bay, CA (US); Keller Rinaudo, Menlo Park, CA (US); Nicholas Brake, San Luis Obispo, CA (US); Ryan Oksenhorn, Pacifica, CA (US); Ryan Patterson, Littleton, CO (US); William Hetzler, San Mateo, CA (US)

(73) Assignee: ZIPLINE INTERNATIONAL INC., South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/544,720

(22) Filed: Aug. 19, 2019

(65) Prior Publication Data

US 2020/0143693 A1 May 7, 2020

Related U.S. Application Data

(63) Continuation of application No. 15/659,735, filed on Jul. 26, 2017, now Pat. No. 10,395,543, which is a (Continued)

(51) Int. Cl.
*G06Q 10/08* (2012.01)
*G08G 5/00* (2006.01)
(Continued)

(52) U.S. Cl.
CPC ......... *G08G 5/0069* (2013.01); *B64C 39/024* (2013.01); *G05D 1/1064* (2019.05);
(Continued)

(58) Field of Classification Search
CPC .... G08G 5/0039; G08G 5/0069; G08G 5/006; G08G 5/0034; G08G 5/003;
(Continued)

(56) References Cited

U.S. PATENT DOCUMENTS

| 4,179,693 A | 12/1979 | Evans et al. |
| 6,584,382 B2 | 6/2003 | Karem |

(Continued)

FOREIGN PATENT DOCUMENTS

| EP | 2664539 | 11/2013 |
| EP | 2799336 | 11/2014 |

(Continued)

*Primary Examiner* — Peter D Nolan
*Assistant Examiner* — Demetra R Smith-Stewart
(74) *Attorney, Agent, or Firm* — Dorsey & Whitney LLP

(57) ABSTRACT

An Unmanned Aerial System configured to receive a request from a user and fulfill that request using an Unmanned Aerial Vehicle. The Unmanned Aerial System selects a distribution center that is within range of the user, and deploys a suitable Unmanned Aerial Vehicle to fulfill the request from that distribution center. The Unmanned Aerial System is configured to provide real-time information about the flight route to the Unmanned Aerial Vehicle during its flight, and the Unmanned Aerial Vehicle is configured to dynamically update its mission based on information received from the Unmanned Aerial System.

20 Claims, 7 Drawing Sheets

Related U.S. Application Data continuation of application No. 15/150,269, filed on May 9, 2016, now Pat. No. 9,747,808, which is a continuation of application No. 14/603,267, filed on Jan. 22, 2015, now Pat. No. 9,489,852.

(51) Int. Cl.
*G05D 1/10* (2006.01)
*B64C 39/02* (2006.01)
*G01C 21/20* (2006.01)

(52) U.S. Cl.
CPC ............ *G08G 5/003* (2013.01); *G08G 5/006* (2013.01); *G08G 5/0034* (2013.01); *G08G 5/0039* (2013.01); *B64C 2201/123* (2013.01); *B64C 2201/126* (2013.01); *B64C 2201/128* (2013.01); *B64C 2201/141* (2013.01); *B64C 2201/146* (2013.01); *G01C 21/20* (2013.01); *G06Q 10/083* (2013.01); *G06Q 10/087* (2013.01); *G06Q 10/0833* (2013.01); *G06Q 10/08355* (2013.01)

(58) Field of Classification Search
CPC ............ B64C 39/024; B64C 2201/126; B64C 2201/128; B64C 2201/141; G05D 1/101; G05G 5/0039; G06Q 10/08345; G06Q 10/0833; G06Q 10/08355
See application file for complete search history.

(56) References Cited

U.S. PATENT DOCUMENTS

| | | | |
|---|---|---|---|
| 6,895,301 B2 | 5/2005 | Mountz |
| 6,950,722 B2 | 9/2005 | Mountz |
| 7,024,340 B2 | 4/2006 | Nichols et al. |
| 7,059,566 B2 | 6/2006 | Byers et al. |
| 7,219,856 B2 | 5/2007 | Watts et al. |
| 7,243,001 B2 | 7/2007 | Janert et al. |
| 7,343,232 B2 | 3/2008 | Duggan et al. |
| 7,392,151 B2 | 6/2008 | Makela |
| 7,532,947 B2 | 5/2009 | Waddington |
| 7,725,257 B2 | 5/2010 | Strelow et al. |
| 7,856,294 B2 | 12/2010 | Van Gaasbeck et al. |
| 7,987,107 B2 | 7/2011 | Wilson |
| 8,078,349 B1 | 12/2011 | Prada Gomez et al. |
| 8,358,677 B2 | 1/2013 | Collette et al. |
| 8,464,981 B2 | 6/2013 | Goldie et al. |
| 8,483,869 B2 | 7/2013 | Wurman et al. |
| 8,543,265 B2 | 9/2013 | Ekhaguere |
| 8,565,913 B2 | 10/2013 | Emanuel et al. |
| 8,615,473 B2 | 12/2013 | Spiegel et al. |
| 8,626,361 B2 | 1/2014 | Gerlock |
| 8,682,504 B2 | 3/2014 | Vos et al. |
| 8,688,306 B1 | 4/2014 | Nemec et al. |
| 8,688,598 B1 | 4/2014 | Shakes et al. |
| 8,712,608 B2 | 4/2014 | Pepicelli et al. |
| 8,781,727 B1 | 7/2014 | Bonawitz et al. |
| 8,788,121 B2 | 7/2014 | Klinger |
| 8,825,226 B1 | 9/2014 | Worley, III |
| 8,862,403 B1 | 10/2014 | Piponi et al. |
| 8,886,459 B2 | 11/2014 | Stefani et al. |
| 8,909,391 B1 | 12/2014 | Peeters |
| 8,930,044 B1 | 1/2015 | Peeters et al. |
| 8,948,935 B1 | 2/2015 | Peeters et al. |
| 8,979,032 B1 | 3/2015 | Hester et al. |
| 8,983,455 B1 | 3/2015 | Frolov et al. |
| 8,983,682 B1 | 3/2015 | Peeters et al. |
| 8,989,922 B2 | 3/2015 | Jones et al. |
| 9,051,043 B1 | 6/2015 | Peeters et al. |
| 9,070,101 B2 | 6/2015 | Abhyanker |
| 9,075,415 B2 | 7/2015 | Kugelmass |
| 9,102,406 B2 | 8/2015 | Stark et al. |
| 9,120,568 B2 | 9/2015 | Herman et al. |
| 9,158,304 B2 | 10/2015 | Fleck |
| 9,280,757 B2 | 3/2016 | Parpia et al. |
| 9,307,383 B1 | 4/2016 | Patrick |
| 9,329,596 B2 | 5/2016 | Cima |
| 9,346,547 B2 | 5/2016 | Patrick |
| 9,487,356 B1 | 11/2016 | Aggarwal |
| 2004/0211862 A1 | 10/2004 | Elam |
| 2011/0130636 A1 | 6/2011 | Daniel et al. |
| 2012/0226394 A1 | 9/2012 | Marcus |
| 2014/0032034 A1 | 1/2014 | Raptopoulos et al. |
| 2014/0117147 A1* | 5/2014 | Hanna .................. B64C 39/024 244/2 |
| 2014/0142785 A1 | 5/2014 | Fuentes et al. |
| 2014/0172194 A1* | 6/2014 | Levien ................ G08G 5/0091 701/2 |
| 2014/0180914 A1 | 6/2014 | Abhyanker |
| 2014/0249692 A1 | 9/2014 | Levien |
| 2014/0254896 A1 | 9/2014 | Zhou et al. |
| 2014/0277834 A1 | 9/2014 | Levien |
| 2014/0277854 A1 | 9/2014 | Jones et al. |
| 2014/0316243 A1 | 10/2014 | Niedermeyer |
| 2014/0316616 A1 | 10/2014 | Kugelmass |
| 2014/0330456 A1 | 11/2014 | Lopez |
| 2014/0344118 A1 | 11/2014 | Parpia et al. |
| 2015/0076285 A1 | 3/2015 | Chavez |
| 2015/0120094 A1 | 4/2015 | Kimchi et al. |
| 2015/0148988 A1 | 5/2015 | Fleck |
| 2015/0158587 A1 | 6/2015 | Patrick |
| 2015/0158599 A1 | 6/2015 | Sisko |
| 2015/0248640 A1 | 9/2015 | Srinivasan |
| 2015/0323932 A1 | 11/2015 | Paduano et al. |
| 2015/0327136 A1 | 11/2015 | Kim et al. |
| 2015/0370251 A1 | 12/2015 | Siegel |
| 2016/0007327 A1 | 1/2016 | Jang |
| 2016/0196525 A1* | 7/2016 | Kantor ................ G08G 5/0013 705/330 |
| 2016/0247116 A1 | 8/2016 | Olivo |

FOREIGN PATENT DOCUMENTS

| | | |
|---|---|---|
| WO | WO2005119178 | 12/2005 |
| WO | WO2016019242 | 2/2016 |
| WO | WO2016039882 | 3/2016 |

\* cited by examiner

UNMANNED AERIAL VEHICLE MANAGEMENT SYSTEM

CROSS-REFERENCE TO RELATED APPLICATION(S)

This application is a continuation patent application of U.S. patent application Ser. No. 15/659,735, filed Jul. 26, 2017 and titled "Unmanned Aerial Vehicle Management System," now U.S. Pat. No. 10,395,543, which is a continuation patent application of U.S. patent application Ser. No. 15/150,269, filed May 9, 2016 and titled "Unmanned Aerial Vehicle Management System," now U.S. Pat. No. 9,747,808, which is a continuation patent application of U.S. patent application Ser. No. 14/603,267, filed Jan. 22, 2015 and titled "Unmanned Aerial Vehicle Management System," now U.S. Pat. No. 9,489,852, the disclosures of which are hereby incorporated herein by reference in their entireties.

TECHNICAL FIELD

This disclosure relates generally to Unmanned Aerial Systems (UASs), and, in particular, it describes a system for reliably operating one or more Unmanned Aerial Vehicles (UAVs) to perform various functions, including, but not limited to, package delivery, data capture, mapping, surveillance, and infrastructure-provisioning.

BACKGROUND

While there are existing systems that perform package delivery, data capture, mapping, and surveillance using manned-aircraft, operating a reliable system using unmanned and autonomous aerial vehicles has been challenging. Yet the benefits of using autonomous aerial vehicles rather than manned aircraft are substantial. For example, manned aircraft require human operators and large, secure areas for takeoff, landing, storage, and other logistics and infrastructure. Moreover, large, manned aircraft are expensive to maintain and operate, making them unsuitable for performing shorter missions or missions requiring smaller payloads. Further, installations for operating manned aircraft (e.g., airfields, airports, etc.) are difficult to scale or relocate. For example, it is neither simple nor inexpensive to relocate aircraft, facilities, and personnel in response to changes in demand for air services. Finally, human error accounts for a large percentage of aircraft accidents.

Accordingly, it would be beneficial to provide unmanned and autonomous aerial vehicle systems, and associated methods, in order to address these and other drawbacks of traditional manned aircraft.

SUMMARY

Embodiments discussed herein are related to methods and systems for fulfilling a service request from a user, using an unmanned aerial vehicle.

In some embodiments, a method for fulfilling a request from a user includes, receiving a service request from a remote client device operated by the user, where the service request specifies a destination site, and selecting a distribution center based on the destination site. The method further includes sending at least a portion of the service request to the distribution center, generating mission data that is communicated to an unmanned aerial vehicle, and configuring the unmanned aerial vehicle to navigate to the destination site using the mission data.

The mission data comprises a skymap, where the skymap contains data about one or more flight corridors. The unmanned aerial vehicle is configured to navigate to the destination site using the one or more flight corridors.

The method further comprises computing a traversal cost for each of a plurality of flight corridors and determining a lowest cost route to the destination site using the computed traversal cost.

The method may further comprise selecting the distribution center based on its distance from the destination site and the availability of a payload type specified in the service request at the distribution center.

The method may further comprise generating a route to the destination location based on a route refinement selection received from the remote client device.

Other embodiments are disclosed herein. The features, utilities and advantages of various embodiments of this disclosure will be apparent from the following description of embodiments as illustrated in the accompanying drawings.

BRIEF DESCRIPTION OF THE DRAWINGS

The figures use like reference numerals to identify like elements. A letter after a reference numeral, such as "100a," indicates that the text refers specifically to the element having that particular reference numeral. A reference numeral in the text without a following letter, such as "100," refers to any or all of the elements in the figures bearing that reference numeral (e.g. "100" in the text refers to reference numerals "100a" and/or "100b" in the figures).

DETAILED DESCRIPTION

While the present disclosure has been described with reference to various embodiments, it will be understood that these embodiments are illustrative and that the scope of the disclosure is not limited to them. Many variations, modifications, additions, and improvements are possible. Modules and procedures may be separated or combined in different ways in various embodiments, or described with different terminology. These and other variations, modifications, additions, and improvements may fall within the scope of the disclosure as defined in the claims that follow.

As noted above, the benefits of using autonomous aerial vehicles rather than manned aircraft are substantial. For example, systems utilizing autonomous vehicles are capable of operating without skilled human pilots and can bring many benefits when compared to human-piloted systems. Because UAVs do not need to carry a human pilot, they can be made smaller than conventional aircraft. A small UAV can perform missions that are impossible or uneconomical for a full-sized manned aircraft. It is possible for smaller UAVs to access locations that lack the infrastructure or physical space to accommodate full-sized aircraft. For example, UAVs can land in undeveloped locations that lack paved runways and can fly in urban environments where space between structures is limited.

In addition, expanding and relocating operations for a UAS can be done more easily in response to market conditions, since often a UAS is not as constrained by the availability of skilled workers—such as pilots—as a manned system would be, and some of the skilled workers can perform their tasks remotely, largely removing the need for worker relocation as the system expands.

Finally, UASs can improve the safety and reliability of large-scale air operations through the application of rigidly enforced safety rules, automatic checks, comprehensive reporting and logging, and other safety measures.

The UAS system described herein provides a reliable and efficient aerial platform for performing various target functions, including, but not limited to, package delivery, data capture, mapping, surveillance, and infrastructure provisioning. While specific embodiments of the UAS system are described herein, some embodiments may comprise systems and methods that are not generally relevant to every target function. One skilled in the art will readily recognize the relevance of a recited system or method in relation to the target functions.

Unmanned Aerial System (UAS)

Figure 1A:
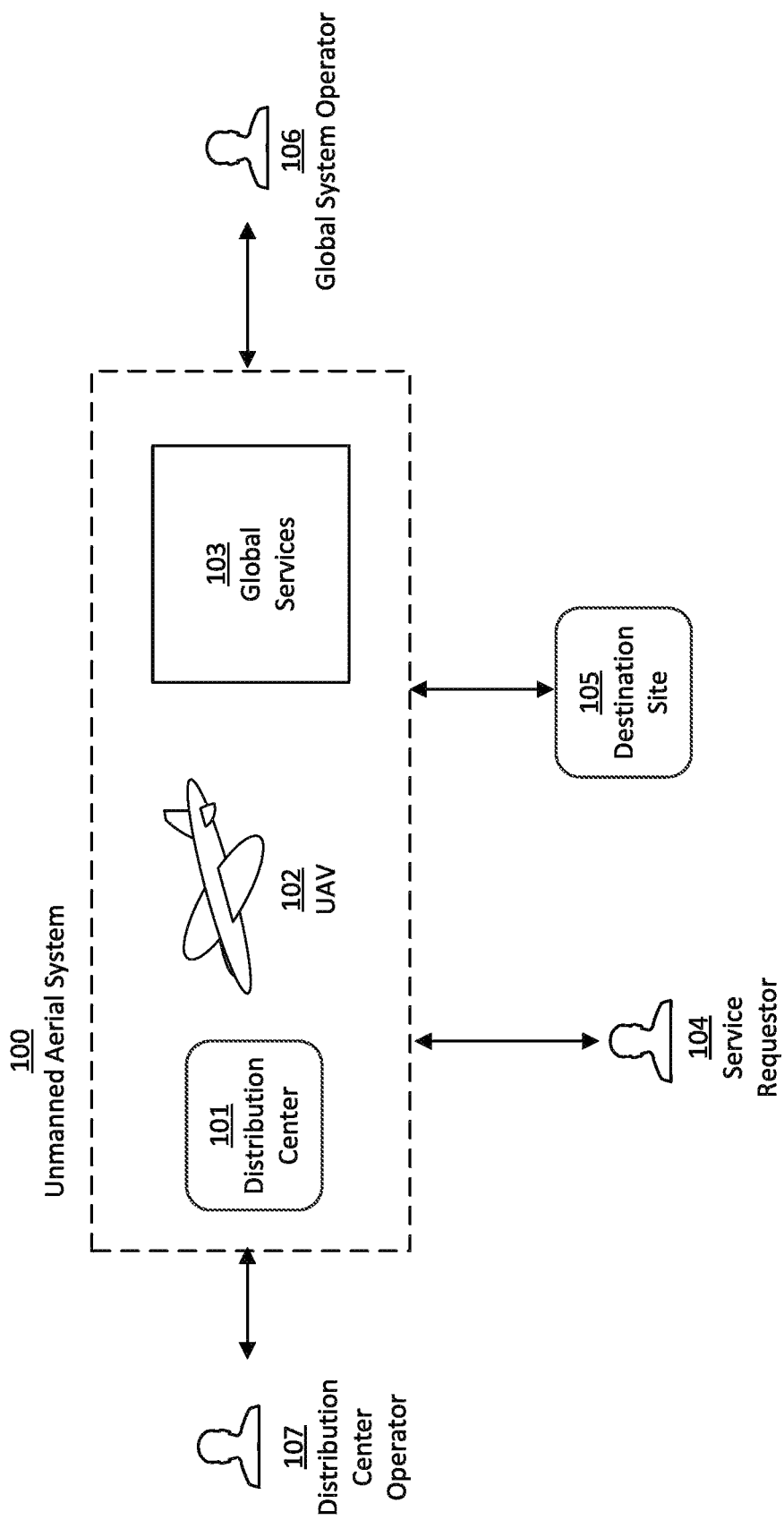
FIG. 1A is a diagram illustrating the components of a UAS and entities that may interface with it, according to one example embodiment.

FIG. 1A illustrates an embodiment of a UAS and interfacing entities. The UAS 100 receives a service request from a service requestor 104 and deploys a UAV 102 to fulfill that request. In this embodiment, the UAS 100 comprises a distribution center 101, a UAV 102, and global services 103.

The service requestor 104 is a human user or an autonomous system that issues a service request to the UAS 100. In the case where the service requestor 104 is a human user, that user may use a remote client device such as a mobile phone, tablet, or personal computer to issue the request. A service request is an instruction to the UAS 100 to provide some service at the destination site 105. The destination site 105 may be any designated location, such as a portion of open ground, a building, a mailing address, a GPS coordinate, or a slice of airspace. In some embodiments, the destination site 105 is the location of a beacon device. The beacon device may be any device that emits a signal that can be used to track or identify a location, such as for example a transponder, a mobile phone, etc. The destination site 105 may also be designated by identifying a particular object, such as, for example, a designated vehicle, a mailbox, a delivery pad, or some other target object that can be tracked to indicate a target location for a service. In another embodiment, the destination site 105 is the location of the service requestor 104, although this need not be the case. Although one service requestor 104 and one destination site 105 are illustrated in this embodiment, in practice there can be many service requestors 104 and destination sites 105.

The requested service may be any service that can be provided from an airborne platform. For example, in one embodiment, the service request issued by the service requestor 104 is a request to deliver a package containing a specific payload to the destination site 105. In another embodiment, the service request is a request to capture image data using a camera mounted on the UAV 102, at the destination site 105 or along a route to and from the destination site 105. In yet another embodiment, the service request is a request to provide an Internet access point at the destination site 105 using a Wi-Fi gateway mounted on the UAV 102. Many other services can be provided using the UAS 100 at the destination site 105, such as package pickup, surveillance, mapping, data capture using UAV-mounted instruments, etc.

The UAV 102 is an Unmanned Aerial Vehicle. The UAV 102 can be implemented using a variety of systems and airframes. Almost any practical flying platform can be used as the vehicle base for the UAV 102, including gliders, airplanes, balloons, helicopters, etc. In one embodiment, the UAV 102 is implemented using a fixed-wing aircraft with redundant propulsion systems that is optimized for long-range flight. In another embodiment, the UAV 102 is implemented using a quad-rotor aircraft that is optimized for short-range flight and vertical takeoff and landing. In yet another embodiment, the UAV 102 is implemented using a hybrid fixed-wing aircraft, with tilt-rotors, capable of both long-range flight and vertical takeoff and landing. In another embodiment, the UAV 102 is implemented using a fixed-wing aircraft with fixed horizontally oriented motors, configured to provide horizontal thrust, and separate fixed vertically oriented motors configured to provide vertical thrust. The UAV 102 may also be implemented using a lighter than-air-platform such as a balloon, blimp, or other dirigible. One purpose of the UAV 102 in the UAS 100 is to serve as a flexible platform that can be rapidly deployed on demand, with minimum human involvement.

The UAV 102 may carry any suitable payloads, depending on the nature of the service request received from the service requestor 104. Components of the UAV 102 are explained in more detail in the description for FIG. 2. Although a single UAV 102 is depicted in FIG. 1, there may be more than one UAV 102 in a UAS 100.

The distribution center 101 is a fixed or mobile facility that facilitates the launch, recharge, communications, repair, and payload logistics for the UAV 102. The distribution center 101 is explained in further detail in the description for FIG. 3. Although a single distribution center 101 is shown in FIG. 1A, there may be more than one distribution center 101 in the UAS 100. In one embodiment, each UAV 102 in the UAS 100 is based at a single distribution center 101, and is repaired, reloaded, and recharged at that distribution center 101. In another embodiment, each UAV 102 can be repaired, reloaded, and recharged at any distribution center 101 in the UAS 100, and UAVs 102 may be routed between distribution centers 101 based on the logistical requirements of current service requests and the projected requirements for future service requests.

The global services 103 may be comprised of one or more computer server systems, running software services (i.e. computer software programs), accessible through the Internet, which provide offsite support, administration, air traffic control, communications, data storage and logistics functions for the distribution centers 101 and the UAVs 102. In one embodiment, the global services 103 route a service request from a service requestor 104 to a distribution center 101 that is geographically adjacent to (or in relative geographic proximity to) the destination site 105. The global services 103 are explained in more detail in the description for FIG. 4A.

The global system operator 106 may be a human user that monitors and operates the UAS 100 to ensure the correct and efficient functioning of the system. For example, in some embodiments, the global system operator 106 may monitor the UAS 100 through the computer servers of the global services 103, to ensure that a distribution center 101 has the appropriate payload in stock to fulfill a service request from a service requestor 104. In one example embodiment, the global system operator 106 may use the global services 103 to route new stock of a particular payload to a distribution center 101 in anticipation of that payload stock being depleted.

There may be more than one global system operator 106, and the global system operators 106 may monitor and provide services for multiple distribution centers 101, UAVs 102, and service requestors 104. In some embodiments, one or more of the global system operators 106 are trained UAV pilots, and the UAS 100 may hand over control of a UAV 102 to one such operator, temporarily or for the duration of a UAV mission.

The distribution center operator 107 is a human user that monitors and operates the distribution center 101. The distribution center operator 107 may ensure that the UAS 100 components that are local to the distribution center 101 function correctly. This includes the UAVs 102 based at the distribution center 101, as well as other components such as launchers, rechargers, payloads, etc. The distribution center 101 provides systems and methods to facilitate the tasks of the distribution center operator 107. For example, in some embodiments, the distribution center operator 107 operating a distribution center 101 is provided with an operator interface that allows her to determine the inventory of each type of payload at that distribution center 101, and that enables her to order more of any type of payload that is in short supply. The distribution center systems and methods that facilitate the distribution center operator 107's work are explained in more detail in the description for FIG. 3.

Figure 1B:
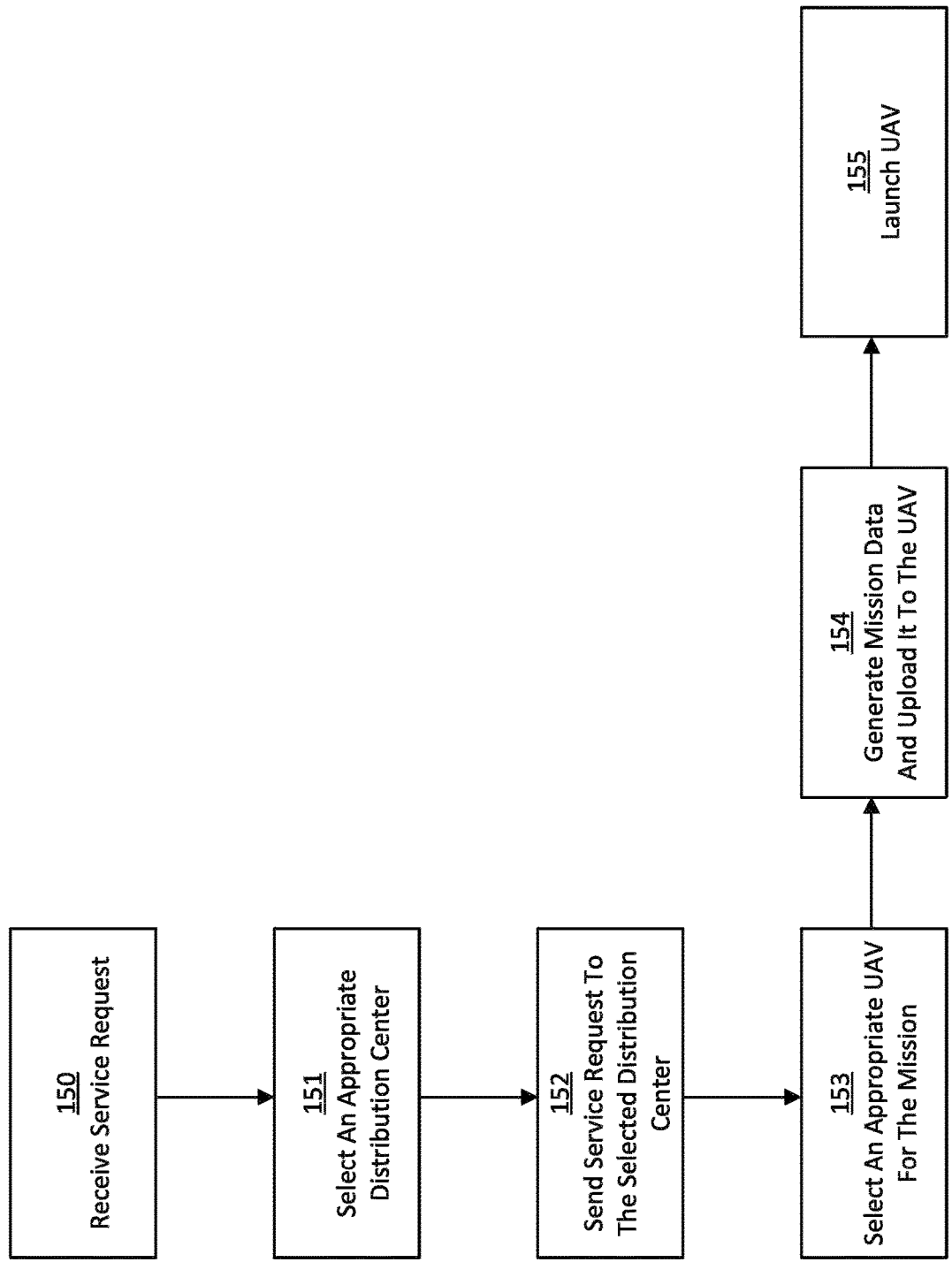
FIG. 1B is a diagram illustrating a UAV launch process, according to one example embodiment.

FIG. 1B illustrates one embodiment of a UAV launch process implemented by the UAS 100. As an initial step the global services 103 of the UAS 100 receive 150 a service request from a service requestor 104. The service request specifies a destination site 105, which designates the location where the service is to be delivered. As described herein, the service request may also include payload information, corresponding to a payload requested by the service requestor. The global services 103 then select 151 a suitable distribution center 101 from which to fulfill the service request. In some embodiments, the global services 103 select 151 the distribution center 101 from which to fulfill the service request by determining the distribution center 101 that is closest to the location of the destination site 105. In another embodiment, the global services 103 select 151 a distribution center 101 to fulfill the service request by taking into account both the proximity of the distribution center 101 to the destination site 105 as well as an inventory at the distribution center 101 that indicates the availability of a payload specified in the service request. For example, if the service request is a request to deliver a specific type of item to the destination site 105, the global services 103 will select the distribution center 101 from those distribution centers that are near the destination site 105 and have the requested item in their inventory. Other factors can also be used to select a distribution center 101, such as, for example, the local weather conditions and air traffic at the distribution centers 101.

Once a distribution center 101 is selected 151, at least a portion of the information in the service request is sent 152 to that distribution center 101. In addition to the destination site location and payload information, the service request may contain other information that is useful at the distribution center 101 for the fulfillment of the service request. For example, in some embodiments, the service request further comprises a time designating when the service request should be fulfilled at the destination site 105.

A UAV 102 can be selected 153 to fly a mission to fulfill the request, either during the distribution center selection process or afterwards. The UAV 102 that will fly the mission may be selected 153 based on one or more criteria that are relevant to the service request and/or system efficiency. For example, in one embodiment, the UAV 102 is selected 153 based on the charge level of its battery and the distance to the destination site 105. In another embodiment, the UAV 102 is selected 153 based on the instruments that are installed on its airframe and a type of data capture specified in the service request. In yet another embodiment, the UAV 102 is selected 153 based on a package in its payload matching a package specified for delivery in the service request.

In an alternative embodiment, the UAS 100 does not select from pre-configured UAVs for a given mission. Instead, either the distribution center 101 or the global services 103 determine a set of components that are required to complete the service request, and the distribution center 101 causes a UAV comprising the required components to be assembled for the mission. For example, if the destination site 105 is a certain distance from the distribution center 101, the UAV for the mission can be configured with a suitable battery pack and engines to complete a round-trip flight to that destination.

The selection 153 of the UAV 102 may occur after the selection 151 of the distribution center, or may be used as a factor in selecting 151 the distribution center 101. For example, the distribution center 101 may be selected 151 from only those distribution centers that have a particular type of UAV airframe, UAV battery, or UAV engine, based on the weight of a payload required by the service request.

Once the UAV 102 is selected 153 for the mission, mission data is generated 154 for it. The mission data is information that enables the UAV 102 to navigate to the destination site 105 and fulfill the service request. In some embodiments, the mission data includes GPS coordinates for the destination site 105 as well as flight corridor information facilitating navigation to those GPS coordinates. The flight corridor information is discussed in more detail in the descriptions for FIG. 2A and FIG. 3. Further details related to the mission data are discussed in the descriptions for FIG. 2A, FIG. 3, and FIG. 4A. After the mission data is generated 154, it is uploaded into a database on the UAV 102.

Once the mission data is generated and uploaded 154, the UAV 102 is launched 155. From the time the UAV 102 is launched and until it lands again, it is considered to be on a mission to complete the service request. In one embodiment, the UAV 102 may be launched with a mission to fulfill more than a single service request. In another embodiment, at least a part of the mission data is uploaded and perhaps even generated, after the UAV 102 is launched 155.

Unmanned Aerial Vehicle (UAV)

Figure 2A:
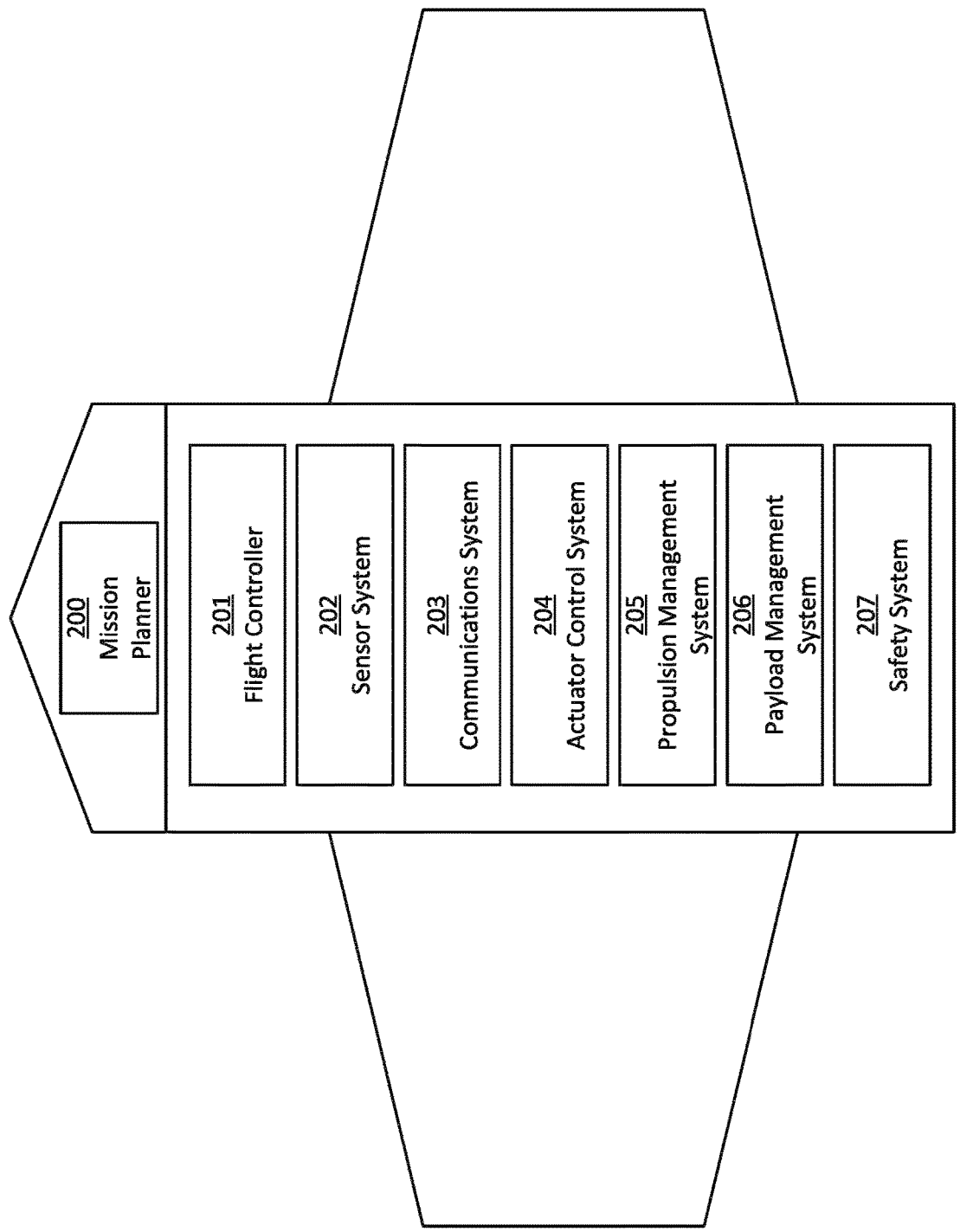
FIG. 2A is a diagram illustrating the components of a UAV, according to one example embodiment.

FIG. 2A is a block diagram of a UAV 102 according to one example embodiment. The UAV 102 is an aircraft system with hardware and software modules that enable it to fulfill service requests with little or no human supervision. In one embodiment, the UAV 102 is comprised of a commercially available airframe that is modified to include additional hardware and software modules that enable it to fly autonomously and complete a service request. In another embodiment, the UAV 102 is comprised of a purpose-built airframe with integrated hardware and software modules that enable autonomous operation. The embodiment of the UAV 102 illustrated in FIG. 2A comprises a mission planner 200, a flight controller 201, a sensor system 202, a communications system 203, an actuator control system 204, a propulsion management system 205, a payload management system 206, and a safety system 207. In an embodiment of the UAV 102, two or more of the modules mentioned above may be combined into a single hardware component to reduce complexity, improve reliability, reduce weight, and/or reduce cost. For instance, in one example embodiment, the mission planner 200 and the flight controller 201 may be implemented using software modules that run on the same System On Chip (SOC) hardware.

Although not depicted in the figure, the modules of the UAV 102 are interconnected via at least one communications bus. The bus allows the modules to communicate with each other to receive and send information and commands. The bus may be implemented using any of the methods known to those with familiarity in aviation and vehicle engineering. For example, the bus may be implemented using the Controller Area Network (CAN) standard. To improve the reliability of the system, embodiments may use additional redundant buses. For example, a dual-CAN bus can be implemented to prevent a bus failure from causing the UAV to lose control.

The mission planner 200 is a module that provides the other modules of the UAV 102 with high-level directives and goals; the execution of these directives and goals causes the UAV 102 to fulfill a service request. The goals and directives produced by the mission planner 200 are communicated to the other modules of the UAV 102, which may then take other actions to complete a mission, including the generation of additional directives and goals for other modules of the system.

For instance, in one embodiment, the mission planner 200 determines a set of waypoints that the UAV 102 may traverse in order to reach a destination site 105, and provides the location of a first waypoint to the flight controller 201 as a goal, along with a directive to fly to that location. In this embodiment, the flight controller 201 may then, in turn, compute the orientation and propulsion needed to move the UAV 102 towards the goal location; the flight controller 201 may also generate further directives for other modules, such as, for example, for the actuator control system 204 and for the propulsion management system 205. The directives sent to the actuator control system 204 and the propulsion management system 205 may cause them to take actions that change the orientation of the UAV 102 and propel it towards the goal location. As a result of the actions taken by various modules in the UAV 102 in response to the directives and goals of the mission planner 200, the UAV 102 will fly to the designated first waypoint. Once that goal is achieved, the mission planner 200 may send new goals and directives to the other modules, such that the UAV 102 flies to a second waypoint, and a third waypoint, and so on, until the higher-level goal of reaching the destination site 105 is fulfilled.

Besides movement directives, the mission planner 200 may issue other directives to the modules of the UAV 102 that cause actions such as dropping of a payload, capturing of image data, transmitting of data, etc. The mission planner 200 may also receive commands from the global services 103, from human operators, or from third-party controllers (such as air traffic controllers), and may issue directives to the UAV 102 modules based on these commands. For instance, in one example embodiment, the mission planner 200, on board a UAV 102, may receive a command from a human operator to fly back to a distribution center 101 due to an approaching storm. In response to this command, the mission planner 200 will produce new goals and directives that are sent to other modules in the UAV 102, and as a result of these new goals and directives, the UAV 102 will change course and return to the distribution center 101.

The mission planner 200 is provided with mission data prior to the launch of the UAV 102 from the distribution center 101. The mission data includes information that enables the mission planner 200 to locate the destination site 105, to determine an appropriate route to that location, and to perform any request-specific actions required to complete the service request. For example, in some embodiments, the mission planner 200 is provided with a destination location, a route to the destination location, and a series of points along the route where images are to be captured with an on-board camera.

In some embodiments, the mission data includes a local skymap for an area of operation. The area of operation is a geographic region that encompasses the distribution center 101 and the destination site 105. The local skymap includes information about a plurality of flight corridors within the area of operation. In some embodiments, the local skymap is generated from a global skymap, which contains information about flight corridors within a wider geographic area, by selecting the information in the global skymap that pertains to flight corridors within the area of operation.

A flight corridor is an area of airspace that is designated by the UAS 100 for UAV flight. The local conditions in a flight corridor may be monitored by the UAS 100, and the flight corridors may be used by the UAVs 102 to travel safely and efficiently between locations. The local skymap comprises information about each of a plurality of flight corridors. The information about each flight corridor may include, but is not limited to, data about the flight corridor's location, local wind conditions, local air traffic (i.e. other UAVs and aircraft within the flight corridor), precipitation, aerial hazards, geographic obstacles (e.g. Mountains), etc.

Using the information in the skymap, the mission planner 200 develops a dynamic route from the distribution center 101 to the destination site 105, prior to launch or soon after launch. The dynamic route takes into account the goals of the mission as well as the requirement of the UAV 102 to return to a distribution center 101 after fulfilling the service request. In some embodiments, the mission planner 200 receives a pre-generated route from the distribution center 101 or the global services 103, and modifies that route only as conditions in the skymap change over time.

The dynamic route is a sequence of flight corridors that the UAV 102 may traverse to fly from its present location to some goal location. As the UAV 102 flies its mission, it may receive updates to the skymap from the UAS 100, including updates concerning local conditions of the flight corridors in the area of operation. The updates may be received from the global services 103, from the distribution centers 101, or from other UAVs 102. In some embodiments, updates may also be received from the service requestors 104, or from third-parties, such as weather information providers, news services, air traffic controllers, satellites, civil aviation authorities, law enforcement, military aviation authorities, etc.

The mission planner 200 may modify the dynamic route during the mission as the flight corridor updates are received. For example, in some embodiments, the mission planner 200 may alter the dynamic route to avoid flight hazards such as inclement weather, aircraft trespassing into a flight corridor, etc. When the route is modified, the mission planner 200 will re-determine the sequence of flight corridors that will be traversed to reach the goal location.

Figure 2B:
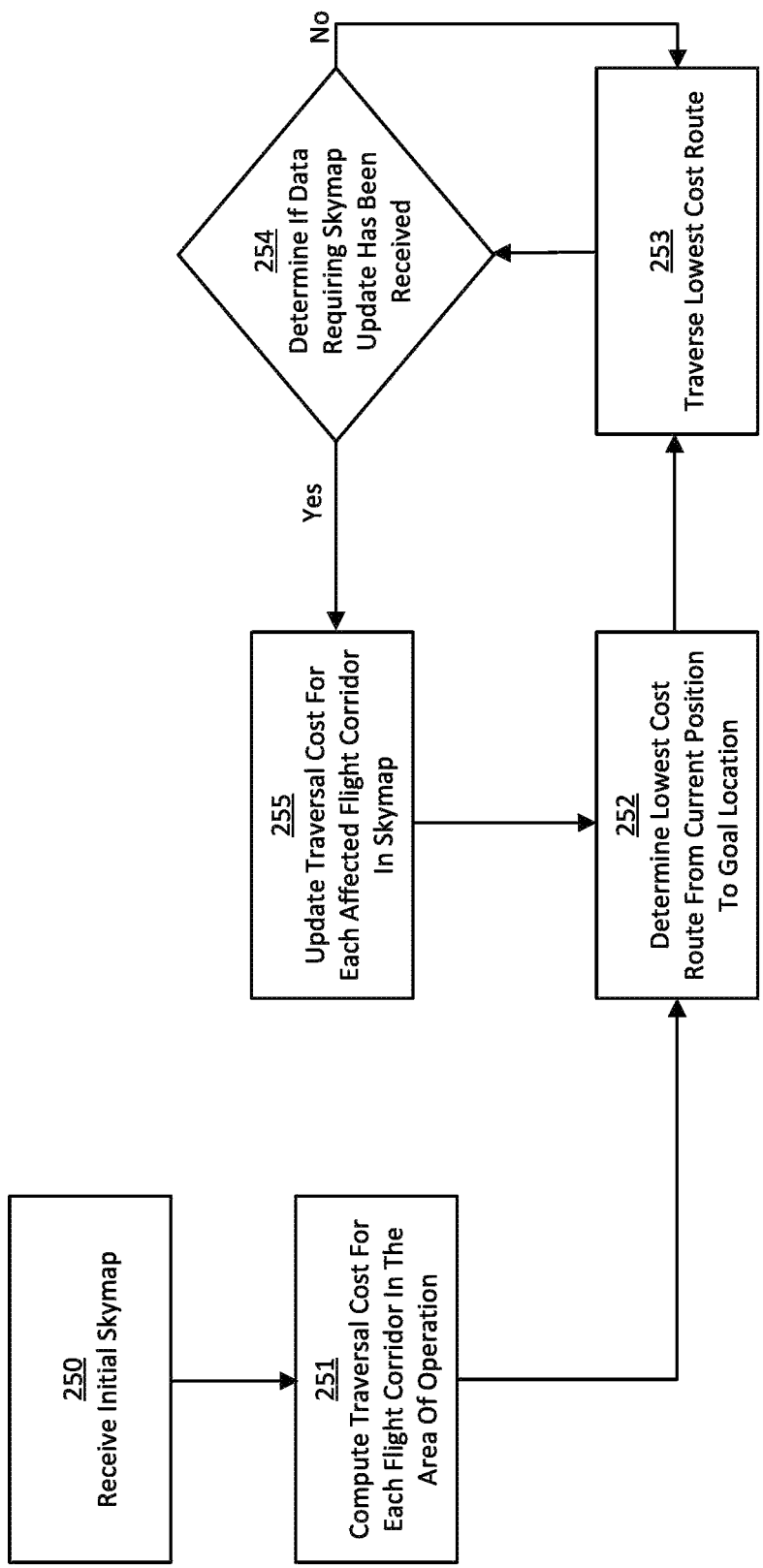
FIG. 2B is a diagram illustrating the process for rerouting a flight, according to one example embodiment.

FIG. 2B illustrates one embodiment of the mission planner 200's dynamic routing process for a goal location. In the illustrated process the UAV 102 first receives 250 an initial local skymap. The skymap may be received prior to launch or after launch. In one embodiment, a skymap is received from the global services 103 directly. In another embodiment, a skymap is received from the distribution center 101.

In one embodiment, the skymap that is provided to the UAV 102 is a global skymap that contains data about the entire area that the UAS 100 covers. In another embodiment, the skymap contains information about only the area of operation for the UAV 102's current mission.

Once the skymap is received 250 the mission planner 200 computes 251 a traversal cost for each flight corridor in the area of operation. The traversal cost for a flight corridor is a measure of the suitability of the corridor's path for a flight to the goal location. The goal location may be any point that the UAV 102 must traverse to complete its mission. For example, the destination site 105 may be the goal location on the outward leg of the UAV 102's mission, while the distribution center 101 may be the goal location on the return leg of the UAV 102's mission. The traversal cost of a flight corridor may take into account many factors, including but not limited to, the wind speed and weather in the flight corridor, the air traffic within the flight corridor, the length and elevation of the flight corridor, and the number and direction of maneuvers required to navigate the flight corridor. The traversal cost for a flight corridor may take into account the predicted energy consumption necessary to fly the UAV 102 along the flight corridor's path. Flight corridors that are predicted to require greater energy to traverse may be assigned a greater traversal cost than flight corridors that require less energy. For example, a flight corridor that has a tailwind may have a lower traversal cost than a flight corridor with a headwind. The traversal cost may also take into account regulatory limits to flight paths. For example, if a flight corridor intersects an area that has been temporarily designated as a no-fly zone by the local aviation authority, the traversal cost for that flight corridor may be set to infinity until the no-fly restriction is lifted.

In some embodiments, the traversal cost for flight corridors is pre-computed by the global services 103 or the distribution center 101, and is included in the skymap received 250 by the UAV 102.

After the traversal cost for each flight corridor in the skymap is computed 251 the mission planner 200 determines 252 a lowest cost route from the UAV 102's current position to the goal location, using the flight corridors. Any appropriate path-finding and/or graph traversal algorithms can be used to find the lowest cost route, including the A* algorithm, Dijkstra's algorithm, and other similar algorithms known to those with skill in the art.

Once the lowest cost route is determined 252, the UAV 102 will traverse 253 the lowest cost route. As the UAV 102 flies to the goal location, it may periodically receive information from the global services 103, the distribution centers 101, other UAVs 102, and third party information sources (such as weather services, aviation authorities, etc.). Any of the data received from such sources may constitute a local skymap update, in the sense that the traversal cost of one or more flight corridors in the area of operations may need to be changed. For example, if the weather in a particular region changes, the traversal cost of flight corridors in that region may increase or decrease depending on the wind in those flight corridors and the direction that the UAV 102 must fly.

The mission planner 200 will determine 254 whether a given piece of data received by the UAV 102 constitutes a local skymap update by applying rules and heuristics to the received information. For example, in some embodiments, if the mission planner 200 receives information that pertains to regions outside the area of operations, it may determine that this information does not constitute a local skymap update.

Some information that the UAV 102 receives may be filtered out from consideration because it is not related to factors that may affect the flight of an aircraft. For example, if the UAV 102 receives information regarding inventory levels at a distribution center 101, this information may be stored or forwarded, but it will not influence the local skymap, since inventory levels will not influence the traversal cost of flight corridors. (Note, however, that changing inventory levels may influence the mission planner 200's selection of a goal destination. For example, after a service request has been fulfilled, a UAV 102 may be routed to land at a distribution center 101 where there are insufficient UAVs in the inventory for future missions, as opposed to the distribution center that it took off from.)

As long as the mission planner 200 determines 254 that no data requiring an update to the local skymap has been received, the UAV 102 continues to fly on the lowest cost route that has already been determined 252. However, if a local skymap update has been received, then the mission planner 200 will update 255 the traversal cost for each affected flight corridor in the local skymap.

The mission planner 200 will then re-determine 252 the lowest cost route to the goal location based on the updated traversal costs of the flight corridors in the local skymap.

As illustrated in FIG. 2A, the UAV 102 also includes a flight controller 201. The flight controller 201 provides the mission planner 200 with guidance, navigation, and control functions. For example, the mission planner 200 is required to know the location, orientation, altitude, and speed of the UAV 102 at various times during the mission, and the flight controller 201 provides this information through a process called state estimation. Similarly, when the mission planner 200 requires the UAV 102 to move from one point to another, it sends commands to the flight controller 201 to achieve that goal. The flight controller 201 communicates over the bus with the sensor system 202, the actuator control system 204, and the propulsion management system 205, to provide the guidance, navigation, and control functions.

The sensor system 202 provides information from sensor instruments to the flight controller 201. In some embodiments, the sensor system 202 comprises several instruments, such as, for example, a Global Positioning System (GPS) unit, an Inertial Measurement Unit (IMU), dynamic pressure sensor, static pressure sensor, air temperature reader, etc.

The actuator control system 204 includes motorized actuators (or actuators that are moved by any other means, such as hydraulics) that control various moving parts on the UAV 102, including the control surfaces on the airframe. The actuator control system 204 can change the state of the motorized actuators based on commands from the flight controller 201. The actuator control system 204 can also report the current state of the motorized actuators back to the flight controller 201.

The propulsion management system 205 controls the force exerted by the engines mounted on the UAV 102—for example by adjusting the speed of propellers mounted on a propeller powered UAV—and monitors the amount of fuel and/or battery capacity remaining on the UAV. The flight controller 201 can adjust the speed of travel of the UAV 102 by communicating with the propulsion management system 205.

The flight controller 201 receives information from the sensor management system 202 and the actuator control system 204, and performs a state estimation that provides a best guess of the UAV 102's position, orientation, and speed to the mission planner 200. The state estimation is continuously updated and checked as the various systems of the UAV 102 provide new information.

The mission planner 200 determines the high-level goal location that the UAV 102 must travel to and communicates the goal location to the flight controller 201. The mission planner 200 may communicate commands and goals to the flight controller 201 using any appropriate technique(s). For example, in one embodiment, the mission planner 200 communicates movement goals to the flight controller 201 via a sequence of waypoints. In another alternative embodiment, the mission planner 200 communicates movement goals to the flight controller 201 via splines.

The flight controller 201 receives the movement goals—as waypoints, splines, or any other suitable form—and determines, based on rules or physics-based models, the commands that must be communicated to the actuator control system 204 and the propulsion management system 205 to achieve the movement goals. For example, according to some embodiments, the physics-based models output the required rudder and elevator state, and the engine thrust for the UAV 102, based on the current state estimation (i.e. the UAV 102's position, orientation, and speed), and the local conditions including wind and temperature.

The communication system 203 comprises transmitters and receivers that enable the UAV 102 to send and receive information using different communications protocols. The communication system 203 may include transmitters and receivers for standard cellular radio technologies such as CDMA, GSM, 3G/4G, LTE, etc., as well as custom line-of-sight and mesh protocols that allow the UAV 102 to directly communicate with a distribution center 101 or another UAV 102.

Although the UAV 102 is designed to operate autonomously, the mission planner 200 is configured to receive instructions via the communications system 203 that may override the mission planner 200's flight plans. For example, the UAV 102 may receive instructions from a distribution center 101 or the global services 103 that command the UAV 102 to return to base immediately due to bad weather or a passenger aircraft entering the area. On receiving such a command the mission planner 200 will change the movement goals of the UAV 102 and issue new directives to the other modules so that the UAV 102 adjusts its flight path as necessary.

The payload management system 206 performs various functions related to the payload carried by the UAV 102, depending on the nature of the service request and the payload. For example, when the payload is attached to the UAV 102 prior to launch, the payload management system 206, will communicate that the attachment is successful to the mission planner 200 and/or the distribution center 101. In the case where the service request is a package delivery, the payload management system 206 also monitors the state of the payload—for example the temperature of the payload in the case where the payload is perishable—and manages the release of the payload at the destination site 105. In this example, the mission planner 200 determines the location, altitude, speed, and orientation of the UAV 102 required to drop the payload safely at the destination site 105, and communicates a command to release the payload at the appropriate time to the payload management system 206. The payload management system 206 receives the command and releases the payload.

The payload management system 206 may perform other functions depending on the nature of the payload. For example, in the case where the service request is related to surveillance or mapping, the payload management system 206 may interface with a camera system included in the payload and can capture images or video based on instructions received from the mission planner 200. For instance, in this embodiment, the mission planner 200 may issue a command to the payload management system 206 to capture images when the UAV 102 flies over some point of interest in its route.

The safety system 207 manages various failsafe components mounted on the UAV 102. For example, in one embodiment, the safety system 207 monitors and controls a parachute system that may be deployed based on a command received from the mission planner 200, or based on information received directly from the flight controller 201 or sensor system 202. For instance, if the UAV 102 enters a non-recoverable dive, the safety system 207 may deploy the parachute based on data received from the sensor system 202. In another embodiment, the mission planner 200 may instruct the safety system 207 to deploy a parachute based on a message received from the global services 103 or a distribution center 101. Parachute deployment on command may be useful in situations where an air traffic control process detects the possibility of imminent collision between multiple aircraft in an area with heavy air traffic. Forcing a UAV 102 to deploy its parachute and descend may prevent it from entering the flight path of other aircraft.

The structure and functionality of the UAV 102 described above has been divided into modules based on one example implementation, but the functionality of various modules may be merged or further split such that there are more or less components than have been illustrated in FIG. 2A. It is also possible to devolve some of the functionality of the various modules directly into the actuators, sensors, and other hardware components of the UAV 102. For instance, the flight controller 201 may communicate directly with a plurality of actuator motors, each of which has the functionality of the described actuator control system 204. Such a decentralization of hardware component control may be beneficial in some implementations from the point of view of fault-tolerance.

Distribution Center

The distribution center 101 handles the local logistics for the UAS 100. When the global services 103 receive a service request from a service requestor 104, the global services 103 will select a distribution center 101 to fulfill the service request according to criteria in the service request, including the location of the destination site 105. The global services 103 will then send at least a portion of the information in the service request to the selected distribution center 101.

The distribution center 101 is responsible for launching and recovering UAVs 102, maintaining and monitoring inventories of payloads and UAVs 102, and communicating local information to the global services 103. Other functions such as UAV or component selection for missions, mission data preparation, UAV monitoring and communication during the mission, and other tasks can be performed by either the distribution centers 101 or the global services 103, depending on implementation and/or system status. A distribution center operator 107 may be stationed at the distribution center 101 to facilitate the distribution center operations.

Figure 3:
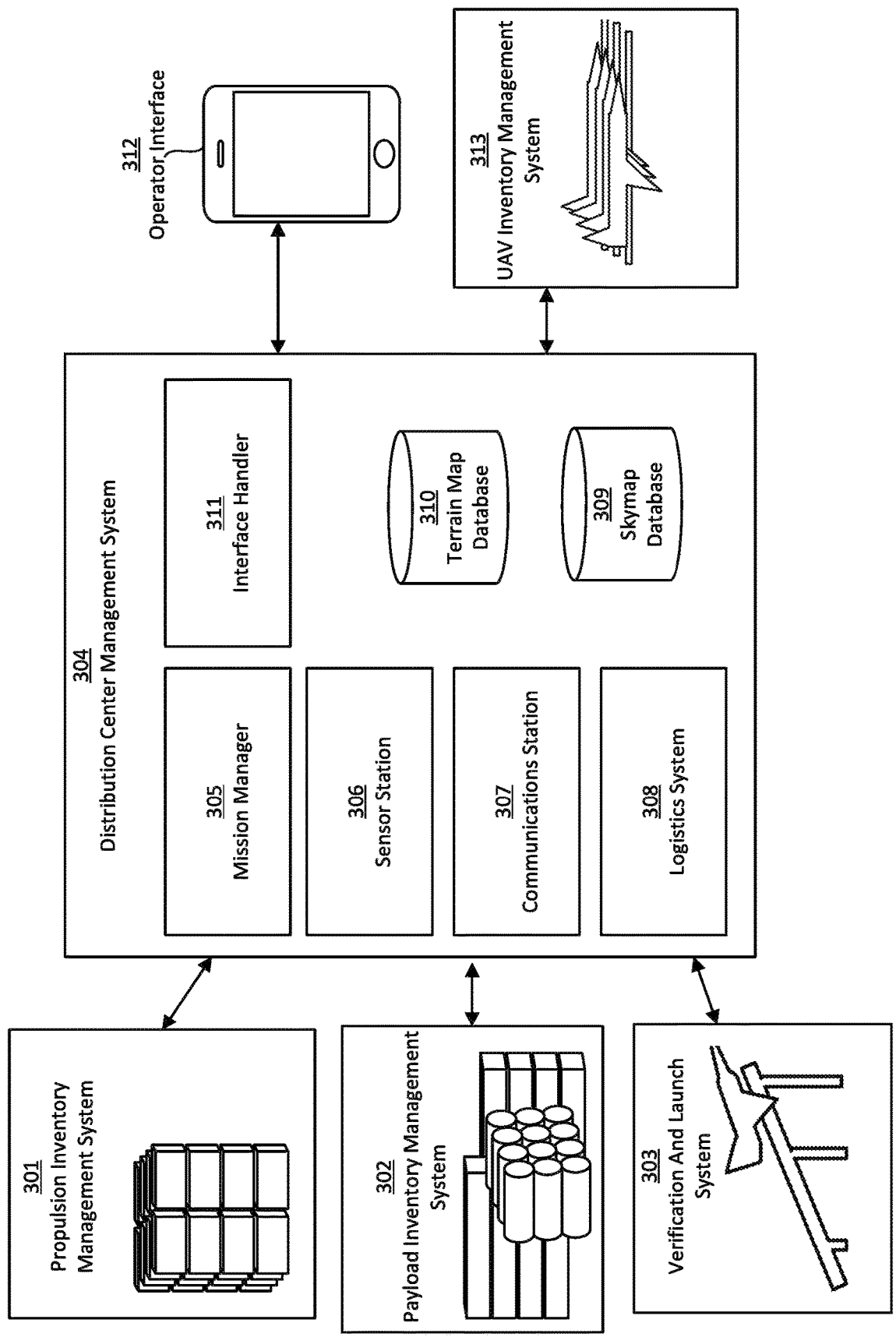
FIG. 3 is a diagram illustrating the components of a distribution center, according to one example embodiment.

FIG. 3 is a block diagram of a distribution center 101, according to one example embodiment. As mentioned previously, some of the functions performed by this embodiment of the distribution center 101 could be performed by the global services 103 instead. Similarly, some of the functions of the global services 103 could be performed locally by the distribution center 101. System designers with skill in the art may divide the functionality of the global services 103 and the distribution centers 101 in any appropriate way based on the requirements of a particular UAS implementation.

In this embodiment, the distribution center 101 is comprised of a propulsion inventory management system 301, a payload inventory management system 302, a verification and launch system 303, a distribution center management system 304, an operator interface 312, and a UAV inventory management system 313.

The distribution center management system 304 serves as the hub of the distribution center 101. In this embodiment, the distribution center management system 304 comprises a mission manager 305, sensor station 306, communications station 307, logistics system 308, skymap database 309, terrain map database 310, and interface handler 311. In one example embodiment, the distribution center management system 304 is implemented using one or more computer servers that have specialized sensor and communications peripherals installed.

Some of the functions of the distribution center 101 may require the assistance of a human distribution center operator 107. For example, UAV assembly, UAV repair, payload attachment and detachment, UAV recovery, battery replacement, and refueling are tasks that may require human involvement if they are not fully automated. The operator interface 312 allows the distribution center operator 107 to receive information and instructions from the distribution center management system 304 and the global services 103, as well as to send information and instructions back to the distribution center management system 304 and the global services 103. The distribution center management system 304 communicates with the operator interface 312 via the interface handler 311. In some embodiments, the operator interface 312 is an application running on a smartphone, a tablet computer, or a personal computer, and the interface handler 311 communicates with the application via a wireless communications protocol, such as IEEE 302.11.

The mission manager 305 is a module that is responsible for managing the local aspects of mission operations at the distribution center 101. In some embodiments, the mission manager 305 receives service requests (or data derived from the service requests) from the global services 103, selects a UAV 102 or UAV components that will be assembled into a UAV 102, prepares the mission data that will be utilized by the UAV 102 during the mission, selects an appropriate payload for the mission, tests and launches the UAV 102, and monitors the status of the UAV 102 and payload during the mission. The mission manager 305 communicates with the distribution center operator 107 via the operator interface 312 during various stages of the mission to communicate both the status of the mission, as well as instructions indicating the actions to be taken to facilitate the preparation, loading, launch, and recovery of UAVs 102.

The mission manager 305 utilizes the other components of the distribution center management system 304 to monitor the status of the local environment and various local components of the UAS 100, including the UAVs 102 and the local inventories.

The mission manager 305 maintains contact with the global services 103 and local UAVs 102 through the communications station 307. Information about service requests is received from the global services 103, and information about local conditions, ongoing missions, inventories, etc., is transmitted back to the global services 103. The communications station 307 may have transmitters and receivers for several different standard telecommunications protocols, including, but not limited to GSM, CDMA, GSM, 3G/4G, LTE, etc. In addition to these standard protocols, the communications station 307 may also support line-of-sight or mesh protocols to enable direct communications with UAVs 102 and other distribution centers 101. Finally, the communications station 307 may also include a wired connection to the Internet for high-speed communication with the other components of the UAS 100 and third-party information providers. The mission manager 305 may send some of the information received via the communications station 307 to the operator interface 312, so that the distribution center operator 107 can monitor the status of UAVs 102 or other components of the UAS 100 that are relevant to a local mission.

The sensor station 306 is primarily used to gather local weather data for the distribution center 101's location. The sensor station 306 may include pressure sensors, thermometers, wind sensors, precipitation detectors, etc. The sensor station 306 may also be used to detect and track UAVs 102 using instruments such as radars, radio trackers, and optical object recognition systems. The mission manager 305 may present information from the sensor station 306 to the distribution center operator 107 via the operator interface 312, so that the distribution center operator 107 can take actions necessary to protect the UAVs 102 and distribution center 101 from inclement weather. For example, if the sensor station 306 detects an approaching storm, the mission manager 305 may display a notification to the distribution center operator 107 via the operator interface 312, and the operator 107 can follow procedures to recover UAVs 102 that have already been launched, to abort missions that have not been launched, and the like.

The logistics system 308 tracks the inventory levels of various components at the distribution center 101, and reports these inventory levels to the global services 103 and the mission manager 305. This inventory information may be used when selecting a particular distribution center 101 to fulfill a service request.

The logistics system 308 interfaces with the propulsion inventory management system 301, the payload inventory management system 302, and the UAV inventory management system 313 to determine the inventory levels of fuel/batteries, payloads, and UAVs/UAV components, respectively. The logistics system 308 is capable of requesting deliveries of additional stock when inventory levels fall below a threshold level or when inventory levels are predicted to fall below a threshold level within a specified period of time.

The global services 103 may monitor the inventory levels reported by the logistics system 308 and may proactively dispatch additional inventory items to a distribution center 101 based on current inventory levels or the predicted inventory levels in the future. The logistics system 308 may also directly notify the distribution center operator 107 of inventory shortages, or of errors with specific items in an inventory, via the operator interface 312. Based on these notifications, the distribution center operator 107 may restock or repair items as needed.

Each item at the distribution center 101 may be affixed with a tracking tag that can be monitored by the logistics system 308. Various technologies can be used to implement the tracking tags, including bar codes, RFID tags, NFC tags, etc. These tags may be affixed to every item at the distribution center 101 that requires tracking, including UAVs 102, UAV components, payloads, batteries, spare parts, etc. The tags associate an object identifier with each tracked physical object at the distribution center 101. For example, each payload at the distribution center 101 will have an object identifier associated with it that is indicated by the tag affixed to it. The object identifier may be read from the tag by way of a reader that is configured to scan the tag. For example, an RFID tag would be read using an RFID reader, an NFC tag using an NFC reader, etc.

The object identifiers can be used to determine the type of an object that has been scanned as well as its unique identity. For example, the tag affixed to a payload object will identify that the object is a payload of a specific type, as well as that it is a specific instance of that payload, different from other payloads of the same type in the inventory. In some embodiments, the object identifier can be used to determine a database entry associated with the object in an inventory database.

The logistics system 308 reports the inventory levels for objects associated with each object identifier to the global services 103.

Propulsion related components of the UAV's, such as batteries and/or fuel, are stored and tracked by the propulsion inventory management system 301. The propulsion inventory management system 301 also has means for recharging batteries, refilling fuel tanks, etc. The propulsion inventory management system 301 reports the inventory levels and status of fuel and/or batteries to the logistics system 308. For example, the propulsion inventory management system 301 may track not only the number of batteries stocked at a particular distribution center 101, but may also track the level of charge in each of those batteries and the expected time for each battery to reach full charge. Additional properties of batteries may also be tracked, such as battery capacity, charge retention over time, etc.

The mission manager 305 is made aware, via the logistics system 308, of the battery charge levels and/or fuel available for UAVs prior to a mission launch. The mission manager 305 determines the energy resources that are required for each UAV 102 based on the service requests and may instruct the distribution center operator 107 to replace batteries on a UAV 102 or to refuel a UAV 102 to ensure that the aircraft has sufficient energy to complete a mission. For example, the mission manager 305 may instruct the distribution center operator 107, via the operator interface 312, to load a battery having a particular charge state onto a specific UAV 102 prior to that UAV 102 being launched on a mission.

The payload inventory management system 302 tracks inventory levels and status for various payloads that may be mounted to the UAVs 102. The payload inventory management system 302 may also provide recharging, refrigeration, and other maintenance related functions related to specific payloads. For instance, if the payload is a vaccine, then the payload inventory management system may provide a refrigerated storage container for vaccine doses and may monitor and report the temperature in the storage container and the number of doses stored in the container to the logistics system 308. The mission manager 305 may notify the distribution center operator 107 of the status of various payloads stored at the distribution center 101 via the operator interface 312. For example, in some embodiments, the mission manager 305 may send a notification to the operator interface 312 to notify the distribution center operator 107 that a particular vaccine stored in the payload inventory management system 302 has expired. Based on this notification the distribution center operator 107 may remove the expired vaccine from storage and replace it with new stock.

The UAV inventory management system 313 tracks the assembled UAVs 102 and UAV components stored at the distribution center 101, and reports this information to the logistics system 308. The mission manager 305 or global services 103 may query the logistics system 308 to determine the UAV resources available for missions at a particular distribution center 101, and may allocate these resources based on the requirements of service requests received by the UAS 100. When a particular UAV configuration is required to fulfill a mission, the mission manager 305 may send instructions to the distribution center operator 107, via the operator interface 312, to assemble a particular set of UAV components—stored in the UAV inventory management system 313—to construct a UAV suitable to complete that mission. As UAVs or UAV components are added and removed from the inventory, the UAV inventory management system 313 tracks not only the availability of these resources, but also the status of components, such as their condition and need for replacement. This information may be used by the mission manager 305 and the global services 103 to order deliveries of new UAVs 102 or components for the distribution center 101.

The mission data that will be uploaded to the UAV 102 is prepared based on the requirements of the service request received from the global services 103. Although we discuss the preparation of the mission data by the mission manager 305, alternative embodiments are possible, where either the global services 103 or the mission planner 200 onboard the UAV 102, prepare the mission data. The mission data includes not only the location of the destination site 105 and the payload required to satisfy the service request, but also information required to generate a flight route to the destination location. The information required for route generation is stored locally in the skymap database 309 and the terrain map database 310.

The skymap database 309 contains data about a plurality of flight corridors in the geographic region served by the distribution center 101. The skymap database 309 may be at least partially synchronized with a global skymap database 400 that is part of the global services 103. The flight corridor data includes information about the real-time conditions within the flight corridors, such as weather, air traffic, etc. The local skymap database 309 updates the flight corridor data based on the latest information received from the global services 103, other distribution centers 101, and third parties (such as weather services and air traffic controllers). UAVs 102 that have recently flown in a flight corridor may also send data to the distribution center 101 about the last monitored conditions present in the flight corridor, and this information may be used by the skymap database 309 to update the relevant flight corridor data. When the local skymap database 309 at the distribution center 101 has more recent information about a flight corridor than the global skymap database 400, the global skymap database 400 is updated via the communications station 307. The reverse is also true, and the latest updates from the global skymap database 400 are received via the communications station 307 and incorporated into the local skymap database 309.

The terrain map database 310 contains terrain data, which is information about the terrain and ground obstacles in the geographic region served by the distribution center 101. This terrain data can be stored in a number of ways, including but not limited to, as raw images, as a heightmap, and as a three-dimensional (3D) mesh. The global services 103 also include a global terrain map database 401, which is at least partially synchronized with the local terrain map database 310. As in the case with the skymap databases, the terrain map database 310 is updated based on data captured from UAVs 102 during their mission flights. For example, if a UAV 102 flies over a location and captures information regarding a new obstacle that was not present at that location in the terrain map database 310, the terrain map database 310 will be updated with the new information via data received from the UAV 102, either during the mission, or after the UAV 102 has been returned to the distribution center 101.

Although the information about the flight corridors from the skymap database 309 may be sufficient to route the UAV 102 to the destination site 105, information about the ground that the UAV 102 is flying over can also be useful during various phases of the mission. For instance, during UAV launch and recovery, the terrain and obstacles near the launch and recovery sites are relevant. In addition, if the service request requires a package delivery, then the terrain and obstacles at the destination site 105 are relevant, as the UAV 102's mission planner 200 must determine a location from which to drop the payload such that the payload lands in an accessible place and does not damage local structures, objects, or persons.

The information from the terrain map database 310 is also useful for fulfilling service requests that require surveillance or mapping. In some instances, the terrain data from the terrain map database 310 can be used to fulfill a surveillance or mapping request without launching a UAV. For example, if a UAV 102 has recently captured imagery at a destination site 105 at a particular location, and a subsequent service request asks for image capture at the same location, within some threshold time limit, then the most recent information from the destination site 105 that has been stored in the terrain map database 310 can be sent to the service requestor 104.

To prepare the mission data locally, the mission manager 305 first determines the location of the destination site 105 from the service request information received from the global services 103. Based on this destination location, and the launch location, which is typically the location of the distribution center 101, the mission manager 305 determines the relevant area of operations for the mission, and extracts the data associated with this geographic region from the skymap database 309 and the terrain map database 310. The extracted information is sent to the UAV 102 as part of the mission data. In some embodiments, the mission manager 305 also provides the UAV 102 with a lowest cost route to the destination site 105 as part of the mission data. Depending on the implementation, the route can be dynamically updated by the global services 103, the mission planner 200 in the UAV 102, and/or the mission manager 305. When the connectivity to the UAV 102 cannot be guaranteed during the mission flight, the mission planner 200 onboard the UAV 102 may be allowed to dynamically update the route. The process for dynamic route generation is explained in more detail in the description for FIG. 2B. In embodiments discussed in connection with FIG. 2B, the UAV 102 receives the skymap data and determines the lowest cost route to the destination site 105 using the onboard mission planner 200, instead of receiving the route from the mission manager 305.

In some embodiments, the UAV 102 stores complete minors of the skymap database 309 and the terrain map database 310, instead of only subsets of the information in these databases. This can be done when the size of the databases is small enough that the storage resources on the UAV 102 are sufficient to store the entire dataset. When this is not the case, a subset of the information may be stored in the UAV 102, as described earlier. Similarly, in the case where the local skymap database 309 and local terrain map database 310 have sufficient storage capacity, the entire global skymap 400 and global terrain map 401 may be stored locally at the distribution center 101. Subsets of the global data may be extracted and stored locally only when the global data sets are too large for complete local mirroring to be economical.

The verification and launch system 303 is responsible for testing, verification, and launching of UAVs 102. The UAVs 102 are loaded into the verification and launch system 303, and their components are tested to ensure that they will perform during the mission. Any faulty components are identified at this stage and brought to the attention of the distribution center operator 107 via the operator interface 312. The verification and launch system 303 also verifies, via the affixed tags, that each component in the assembled UAV 102 is a component allocated by the mission manager 305 for the current mission. For example, the verification and launch system 303 detects the battery and engines attached to the UAV 102, and ensures that they have adequate charge and performance for the mission, prior to launch. Any discrepancies are brought to the attention of the distribution center operator 107 for correction. Similarly, the verification and launch system 303 verifies that the payload loaded onto the UAV 102 is the right payload for the current mission.

Once the verification and launch system 303 verifies the UAV 102, the UAV 102 is launched, and the mission manager 305 continues to monitor the aircraft during the mission flight. The mission manager 305 receives status updates from the UAV 102, and these status updates enable the mission manager 305 to track the progress of the mission at least intermittently. The mission manager 305 may present information related to the UAV 102's status to the distribution center operator 107 via the operator interface 312. In the event that there is some local event that requires a mission termination, such as, for example, an approaching storm, either the mission manager 305 or the distribution center operator 107 (or both), via the operator interface 312, can send a command to the UAV 102, through the communications station 307, to instruct the UAV 102 to return to the distribution center 101.

The structure and functionality of the distribution center 101 described above has been divided into modules based on one example implementation, but the functionality of various modules may be merged or further split such that there are more or fewer components than have been illustrated in FIG. 3. For instance, it is possible to implement many parts of the distribution center management system 304, including the mission manager 305, communications station 307, logistics system 308, and interface handler 311 on a single piece of computer hardware, such as a computer server or embedded SOC. Similarly, the different inventory management systems could be merged under a single inventory manager, while the verification and launch system 303 could be split into a separate verification system and launch system.

Global Services

The global services 103 are a collection of software services running on one or more computer servers, accessible through the Internet or another communications protocol. In one example embodiment, the global services 103 are software modules running on virtual machines in a third-party data center, such as Amazon Web Services or Google Cloud.

One purpose of the global services 103 is to provide a global infrastructure to coordinate, support, and manage multiple distribution centers 101, service requestors 104, and UAVs 102. However, in some embodiments, it is conceivable that the functionality of the global services 103 is provided by a local computer server, and that the server serves a local set of UAVs 102, distribution centers 101, and service requestors 104—possibly only a single one of each.

One or more global system operators 106 connect to the global services 103 and provide human intervention for systems that cannot be fully automated (or are otherwise selected to not be fully automated). The global system operators 106 typically connect to the global services 103 through control devices. A control device may be a computer workstation, a personal computer, a tablet device, a smartphone, or any other computing device that can communicate through a network with the global services 103. For instance, in one example embodiment, a global system operator 106 uses a laptop computer, with an Internet connection, to connect to the global services 103 executing on a computer server, which is also connected to the Internet.

Figure 4A:
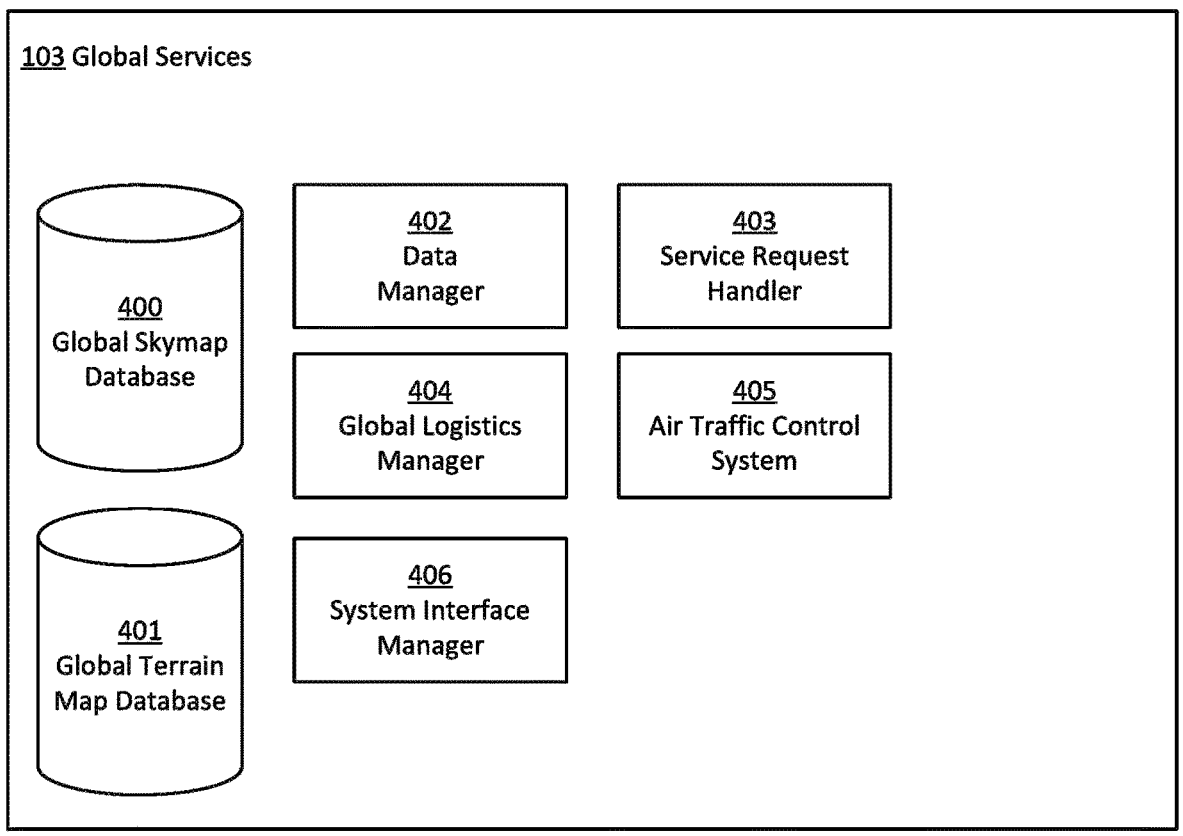
FIG. 4A is a diagram illustrating the components of the global services, according to one example embodiment.

In the example embodiment illustrated in FIG. 4A, the global services 103 are configured to serve a plurality of distribution centers 101, UAVs 102, and service requestors 104. In this embodiment, the global services 103 comprise a global skymap database 400, a global terrain map database 401, a database manager 402, a service request handler 403, a global logistics manager 404, an air traffic control system 405, and a system interface manager 406.

As discussed earlier, the global skymap database 400 and the global terrain map database 401 are global repositories for skymap and terrain map data in the UAS 100. As was the case with the local versions of these databases, the information in these databases can be represented in various ways depending on the needs of the UAS 100. Although these databases are represented as single units in the illustrated embodiment, in practice the databases may be implemented using several mirrored data stores to provide improved read speed, redundancy, and error recovery.

The data manager 402 manages data-writes into, and data-reads out of the global databases. For example, as updates to the local skymap databases 309 and local terrain map databases 310 are communicated to the global services 103, the data manager 402 ensures that the information is stored in the appropriate database and that the latest information is always available and is not overwritten by out-of-date information. The data manager 402 also manages information received from outside of the UAS 100 and integrates this information into the global databases. For instance, information received from third-party weather information providers, aviation authorities, and external air traffic controllers may be integrated into the global skymap database 400. Similarly, third-party topographical data, map imagery, and surveillance data may be integrated into the global terrain map database.

The data manager 402 also manages the updates sent to the local databases at each distribution center 101. In one embodiment, as the global skymap database 400 and global terrain map database 401 are updated, the data manager 402 will monitor the regions where those updates are relevant, and will send at least a portion of those updates to distribution centers 101 that are in the relevant regions. In another embodiment, the mission manager 305 at a distribution center 101 in a particular region will periodically request information about that region from the global services 103, and the data manager 402 will determine the set of information that is relevant to that region from the global databases, and will send that information to the distribution center 101, where the information may be integrated into the local databases. Similarly, a UAV 102 in flight may request information about its current location from the global services 103, and the data manager 402 may similarly determine the relevant information that should be sent back to the UAV 102 based on the UAV 102's location.

The service request handler 403 manages service requests sent by service requestors 104 that are received by the global services 103. When a service request is received by the global services 103, the service request handler 403 will communicate with the global logistics manager 404 to determine a distribution center 101 that is suitable for handling the service request locally. As mentioned previously, the selection of the distribution center 101 may take into account not only the location of a destination site 105 specified in the service request, but also the logistic requirements of the request, such as payload, UAV capability, etc. For instance, a service request may include information that specifies a payload type required to complete the request, and the distribution center 101 may be selected based on the availability of that payload type at various distribution centers 101.

The payload type may be specified directly by means of a payload identifier associated with a type of payload, or it may be specified by implication. For example, a camera payload may be specified by implication if the service request is a request for image data at the destination site 105.

In some embodiments, the service request handler 403 takes input from a global system operator 106 to determine the distribution center 101 that will be used to fulfill a service request.

Once the distribution center 101 and UAV 102 have been identified and reserved to fulfill a service request, the service request handler 403 may notify the service requestor 104 that the service request is in process. The service request handler 403 may also receive information from the distribution center 101 and/or the UAV 102 that allows a predicted time of mission completion to be estimated and sent to the service requestor 104.

The service request handler 403 is capable of communicating with the service requestor 104 via the system interface manager 406. A human service requestor 104 will typically send a service request to the global services 103 by means of some remote client device such as a mobile phone, a tablet, or a personal computer. The system interface manager 406 is capable of sending information to the client device operated by the service requestor 104 that is configured to be displayed on the client device. For example, in one embodiment, the system interface manager 406 functions as a web server, and the client device connects to the web server and displays a web page that is downloaded from the system interface manager 406. In this example, the system requestor 104 can receive and send information to the global services 103 via the displayed web page. In another embodiment, the system interface manager 406 exposes an application interface over the Internet (such as a representational state transfer, or "REST" interface), and an application running on the client device is configured to display information received from the global services 103 to the service requestor 104, and to send information inputted by the service requestor 104 back to the global services 103.

Figure 4B:
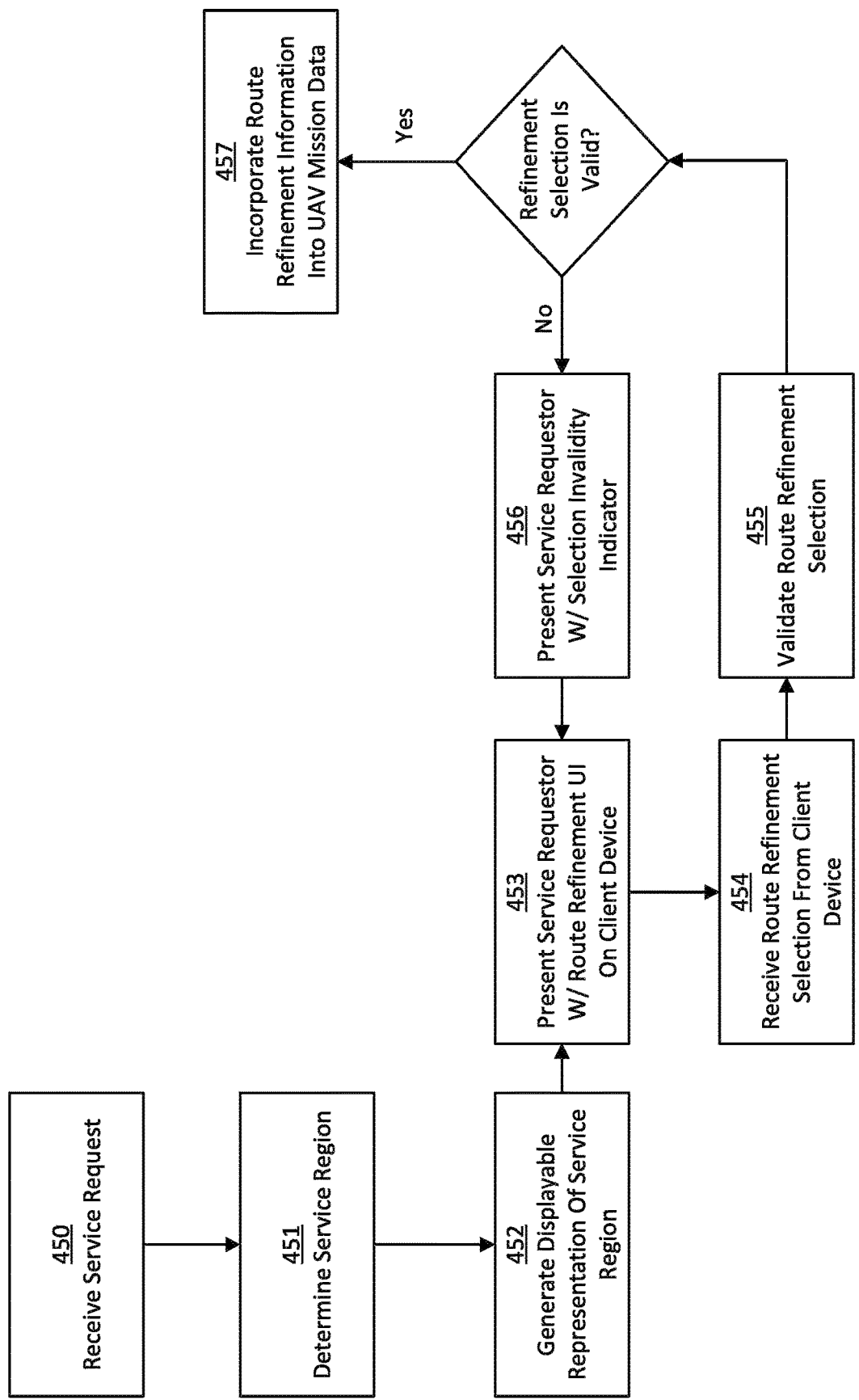
FIG. 4B is a diagram illustrating a process for refining a UAV flight route, according to one example embodiment.

The service request handler 403 may also play an active part in determining the route a UAV 102 takes on a mission to complete a service request. For example, the service request handler 403 may use the system interface manager 406 to query a service requestor 104 for the precise location of the destination site 105, and the information provided by the service requestor 104 may be used to refine the flight route used by the UAV 102 in fulfilling the service request. FIG. 4B illustrates one example embodiment of a process that may be used to refine a UAV 102's flight route for a mission, using information from a service requestor 104.

This embodiment of the process begins when the service request is received 450. Based on the service request, an approximate service region is determined 451. The service region may be a geographic area around a requestor-defined destination site 105, or it may be a geographic area determined based on a location associated with the service requestor 104, such as, for example, a human requestor's home address, or the GPS-determined location of a client device operated by the service requestor 104.

Based on this geographic area, the service request handler 403 queries the data manager 402 for terrain information for the service region. The geographic area of the service region is associated with specific terrain data in the global terrain map database 401. The data manager 402 extracts the terrain data associated with the geographic area of the service region from the global terrain map database 401. The terrain data may be in any relevant form, such as image data, height map data, voxel data, contour data, 3D mesh data, etc. Based on the extracted terrain data, the service request handler 403 generates 452 a displayable representation of the geographic area of the service region. The displayable representation may be in any form that can be visualized on a client device. For example, the displayable representation may be an image, a series of images, a 3D mesh, etc.

The displayable representation is sent to the client device operated by the service requestor 104, where it is displayed. The service requestor 104 is then presented 453 with a route refinement User Interface (UI) that enables the service requestor 104 to select relevant route parameters that can be used to adjust and refine a route. The relevant route parameters depend on the nature of the service request, but are related to information that allows the UAV 102 to refine its flight path at the destination location. For example, in the case of a service request that is a package delivery, the displayable representation on the client device may be a map image of the region where the delivery is requested, and the route refinement UI may allow the service requestor 104 to select a precise point on the image, which will correspond to a location where the UAV 102 will deliver the package. In this example, the route parameter is the selected point, which corresponds to a geographic location within the geographic area of the service region.

In a different embodiment, the displayable representation is a 3D mesh, and a 3D render of the delivery location is displayed on the client device. In this embodiment, the service requestor 104 selects a trajectory in three dimensions, which the UAV 102 will follow to approach the delivery point. In this case the route parameters may be a spline that defines the three-dimensional trajectory selected by the service requestor 104. The route refinement selection, whether a point, a trajectory, or some other data, is sent to the global services 103.

The global services 103 receives 454 the route refinement selection from the client device, and then validates 455 the route refinement selection to confirm that the route refinement selection will not cause the UAV 102 to crash or cause the mission to otherwise fail. Validation is done to ensure that the service requestor 104 has not introduced human error into the routing process. For example, a service requestor 104 could specify a delivery location that is in a body of water, or a trajectory that intersects a building.

Validation may be done using the data in the global terrain map database 401. For example, in some embodiments, validation is performed by checking that the geometry of the route refinement selection received from the client device does not intersect the geometries of objects or terrain in the terrain map database 401.

If the route refinement selection is not valid, the system interface manager 406 will send information to the client device that will cause a "selection invalid" indicator to be presented 456 on the client device, so the service requestor 104 realizes that the route refinement selection previously made cannot be used. Additional information may also be sent, such as, for example, information explaining how the previous route refinement selection was invalid, or visual cues that highlight the invalid route refinement selection in the displayed representation of the region. For instance, an invalid selected trajectory or point may be highlighted in red in a map or 3D render. The client device may then present 453 the route refinement selection UI once more, and send a new route refinement selection to the global services 103.

Once a route refinement selection has been received 454 and validated 455 by the global services 103, the information from the route refinement selection can be used to generate a route or partial route that can be incorporated 457 into mission data that is uploaded into the UAV 102 that will fulfill the service request. For example, if the route refinement selection indicates a location for a package delivery, then the destination site 105 location can be refined to that point, and that refined location may be sent to the distribution center 101 for upload to the UAV 102, or it may be sent directly to the UAV 102. The mission planner 200 of the UAV 102 may use the refined location when it is determining a route to the destination site 105. Similarly, if the route refinement selection is a trajectory that indicates an approach route to the destination site 105, that trajectory can be included in the mission data, and the mission planner 200 in the UAV 102 can incorporate that trajectory in the flight path that the UAV 102 takes on its approach to the destination site 105.

In some embodiments, the service request handler 403 solicits route refinement selection input from the global system operators 106, instead of (or in addition to) soliciting the route refinement selection input from the service requestors 104. The process for obtaining route refinement selections from a global system operator 106 is almost identical to that used for a service requestor 104. In this embodiment the control devices operated by the global system operators 106, are used to display the route refinement selection UI and to collect and send the route refinement selections to the global services 103.

Returning to FIG. 4A, the service request handler 403 utilizes the global logistics manager 404 to obtain information required for distribution center 101 and UAV 102 selection. The global logistics manager 404 tracks the inventory information in each local logistics system 308 at each distribution center 101. The global logistics manager 404 may proactively route additional stock to local distribution centers 101 when supplies of any inventory item are depleted, are below some threshold quantity, or are predicted to be depleted within some threshold time. The global logistics manager 404 may also notify a global system operator 106 in the event of an inventory shortage at a distribution center 101. The global system operator 106 may take actions outside the UAS 100 to route new inventory items to the distribution center 101, such as, for example, ordering and shipping items from a third-party warehouse.

In one embodiment, the global logistics manager 404 relocates UAVs 102 from a first distribution center 101 that has an excess of UAVs to a second distribution center 101 that has a shortage of UAVs. In this embodiment, the global logistics manager 404 may monitor the daily, monthly, or yearly patterns of service requests to determine the estimated UAV requirements at each distribution center 101 over a period of time. Based on these estimated UAV requirements, the global logistics manager 404 may preemptively relocate UAVs from one distribution center 101 to another. The relocation of UAVs 102 may be done using third-party shippers, or the relocation may be done by sending requests to the distribution centers 101 to launch UAVs 102 with destination sites 105 set to other distribution centers 101. As an optimization, these relocation flights may be scheduled during times when the service request volume is low, for example, late at night or during holidays.

The air traffic control system 405 is responsible for tracking the UAVs 102 and aircraft that are known to be in flight in the area served by the UAS 100. The air traffic control system 405 receives information from the distribution centers 101, the UAVs 102 in flight, and from third party air traffic information providers. The information received by the air traffic control system 405 includes the known positions of aircraft in the area of the UAS 100, as well as flight routes that are registered with the system. Distribution centers 101 and/or UAVs 102 may register flight routes for missions, with the air traffic control system 405. The air traffic control system 405 may also allow UAVs and aircraft operated by third parties to register their flight routes.

The air traffic control system 405 provides real-time information updates regarding the positions of aircraft and UAVs to UAVs 102 that are flying missions. Using this information, the mission planners 200 onboard the UAVs 102 may modify their flight routes to avoid colliding with other aircraft. The air traffic control system 405 may offer similar information updates to UAVs and other aircraft that are operating outside the UAS 100 in order to maintain a safer airspace for all aircraft operations.

The air traffic control system 405 also provides information to the service request handler 403 and the global logistics manager 404. Information from the air traffic control system 405 may be used to influence the selection of distribution centers 101 for service requests and the relocation of UAVs 102. For example, a service request may be routed away from distribution centers 101 where there is an excess of air traffic in the vicinity, and UAV relocation may be timed to avoid periods when air traffic is at its highest.

The structure and functionality of the global services 103, described above, has been divided into modules based on one example implementation, but the functionality of various modules may be merged or further split such that there are more or less components than have been illustrated in FIG. 4A. For example, it is possible to merge the skymap and terrain map databases into a single data store. Some of the services illustrated can be moved outside the UAS 100, for example, the air traffic control system 405 and the global logistics manager 404 may be operated outside the UAS 100 as independent services, accessible through an Application Programming Interface (API). These and other changes to the structure do not change the overall architecture of the system, and systems with such changes will be recognized by those with skill in the art as equivalent to the system disclosed.

We claim:

1. A system for fulfilling a request for an airborne delivery, comprising:
a first computer system configured to:
receive a service request from a remote client device operated by a user, the service request specifying at least:
a payload; and
a location of a destination site;
select a distribution center, from a set of candidate distribution centers, based at least in part on the location of the destination site and the payload; and
send a message to the selected distribution center, the message including the payload and the location of the destination site; and
a second computer system associated with the selected distribution center and configured to:
generate mission data including instructions for guiding an unmanned aerial vehicle to the destination site; and
communicate the mission data to the unmanned aerial vehicle at the selected distribution center.

2. The system of claim 1, wherein the instructions for guiding the unmanned aerial vehicle to the destination site include a route from the selected distribution center to the destination site.

3. The system of claim 1, wherein:
the first computer system is further configured to select the distribution center based at least in part on a distance between the distribution center and the destination site.

4. The system of claim 3, wherein the first computer system is further configured to select the distribution center based at least in part on an availability of the payload at the distribution center.

5. The system of claim 1, wherein at least one of the first computer system or the second computer system is further configured to:
cause a displayable representation of a geographic area to be displayed on the remote client device, the geographic area including the destination site; and
receive a route refinement selection from the remote client device.

6. The system of claim 5, wherein:
the displayable representation of the geographic area is a map; and
the route refinement selection comprises a location, on the map, to which the payload is to be delivered by the unmanned aerial vehicle.

7. The system of claim 5, wherein:
the displayable representation of the geographic area is three dimensional representation of the geographic area; and
the route refinement selection comprises a trajectory along which the unmanned aerial vehicle is to fly.

8. A method for fulfilling a request for an airborne delivery, comprising:
receiving, at a computer server, a service request from a remote client device operated by a user, the service request specifying at least:
a payload; and
a location of a destination site;
generating mission data that configures an unmanned aerial vehicle to navigate from a launch site to the destination site, the mission data comprising a first route from the launch site to the destination site, the launch site being a distribution center selected from a plurality of distribution centers after receipt of the service request;
communicating the mission data to the unmanned aerial vehicle;

causing the unmanned aerial vehicle to be launched and to traverse the first route;
while the unmanned aerial vehicle is traversing the first route:
  determining a second route, different from the first route, from a location of the unmanned aerial vehicle to the destination site; and
  sending the second route to the unmanned aerial vehicle; and
causing the unmanned aerial vehicle to transition from traversing the first route to traversing the second route.

9. The method of claim 8, wherein the remote client device is a mobile phone.

10. The method of claim 8, wherein the operation of determining the second route is performed in response to a determination that a weather condition along the first route has changed.

11. The method of claim 8, wherein:
the computer server is a first computer server; and
the method further comprises:
  selecting the distribution center, from the plurality of distribution centers, based at least in part on a distance from the distribution center to the destination site; and
  sending, to a second computer server at the distribution center, the specified payload and the specified location of the destination site.

12. The method of claim 11, wherein the selection of the distribution center is based at least in part on an availability of the specified payload at each of the plurality of distribution centers.

13. The method of claim 8, further comprising:
causing a displayable representation of a geographic area to be displayed on the remote client device, the geographic area including the destination site; and
receiving a route refinement selection from the remote client device.

14. The method of claim 13, wherein:
the displayable representation of the geographic area is a map; and
the route refinement selection comprises a location, on the map, to which the payload is to be delivered by the unmanned aerial vehicle.

15. In a computer system, a method for determining a route for an unmanned aerial vehicle comprising:
receiving, from a remote client device, a service request specifying:
  a payload; and
  a destination site within a geographic area;
generating a first route for the unmanned aerial vehicle from a launch site to the destination site, the launch site being selected from a plurality of launch sites after receipt of the service request; and
causing the unmanned aerial vehicle to traverse the first route; and
while the unmanned aerial vehicle is traversing the first route:
  causing the remote client device to display a map of the geographic area;
  receiving a route refinement selection from the remote client device; and
  generating a second route within the geographic area for the unmanned aerial vehicle using the route refinement selection from the remote client device.

16. The method of claim 15, wherein the route refinement selection comprises a selection of a location within the map displayed on the remote client device.

17. The method of claim 15, wherein:
the route refinement selection comprises a trajectory; and
generating a the second route within the geographic area comprises incorporating the trajectory into the second route.

18. The method of claim 15, wherein:
the map is stored in a map database of the computer system; and
the computer system sends the map to the remote client device.

19. The method of claim 15, wherein the remote client device is a mobile phone.

20. The method of claim 15, further comprising:
determining whether the second route intersects a known object or terrain;
in accordance with a determination that the second route does not intersect a known object or terrain, causing the unmanned aerial vehicle to traverse the second route; and
in accordance with a determination that the second route does intersect a known object or terrain:
  causing the remote client device to initiate a notification that the second route is invalid; and
  causing the remote client device to request an additional route refinement selection.

* * * * *